(12) United States Patent
Williams et al.

(10) Patent No.: US 7,331,016 B2
(45) Date of Patent: Feb. 12, 2008

(54) METHOD AND SYSTEM FOR GENERATING A VALUE ENHANCED DERIVATIVE DOCUMENT FROM A PATENT DOCUMENT

(76) Inventors: Allan Williams, 143 Castle Glen Crescent, Kanata, Ontario (CA) K2L 4G9; Victoria Donnelly, 143 Castle Glen Crescent, Kanata, Ontario (CA)

( * ) Notice: Subject to any disclaimer, the term of this patent is extended or adjusted under 35 U.S.C. 154(b) by 1257 days.

(21) Appl. No.: 09/871,910

(22) Filed: Jun. 4, 2001

(65) Prior Publication Data
US 2002/0184254 A1 Dec. 5, 2002

(51) Int. Cl.
*G06F 15/00* (2006.01)
*G06F 17/00* (2006.01)

(52) U.S. Cl. ............. 715/530; 715/512; 715/513; 715/531; 715/539

(58) Field of Classification Search ........... 715/530, 715/512, 513, 531, 539
See application file for complete search history.

(56) References Cited

U.S. PATENT DOCUMENTS

| | | | | |
|---|---|---|---|---|
| 5,991,751 | A * | 11/1999 | Rivette et al. | 707/1 |
| 6,014,680 | A * | 1/2000 | Sato et al. | 715/513 |
| 6,049,811 | A * | 4/2000 | Petruzzi et al. | 715/507 |
| 6,339,767 | B1 * | 1/2002 | Rivette et al. | 707/2 |
| 6,434,580 | B1 * | 8/2002 | Takano et al. | 715/530 |
| 6,499,026 | B1 * | 12/2002 | Rivette et al. | 707/2 |
| 2002/0007373 | A1 | 1/2002 | Blair et al. | |
| 2003/0046307 | A1 * | 3/2003 | Rivette et al. | 707/104.1 |
| 2004/0103112 | A1 * | 5/2004 | Colson et al. | 707/102 |

FOREIGN PATENT DOCUMENTS

| | | |
|---|---|---|
| EP | 0 768 612 | 4/1997 |
| EP | 1 184798 A | 3/2002 |

OTHER PUBLICATIONS

Larkey, Leah; A patent Search and Classification System; Aug. 1999; Proceedings of the fourth ACM conference on Digital libraries; ACM Press; pp. 179-187.*

\* cited by examiner

*Primary Examiner*—Doug Hutton
*Assistant Examiner*—N Hillery
(74) *Attorney, Agent, or Firm*—Victoria Donnelly

(57) ABSTRACT

The invention describes system and method for generation a derivative document from a patent document, which provide value, enhanced representation of the document and facilitate comprehension of information contained in the patent document. A segment of the patent document is selected and transformed into a value added form by extracting at least two portions of information from the selected segment and converting them into different forms. Conveniently, the converted forms include respective elements where the required correspondence is established between the elements. Depending on customer needs and requirements to the system, a customized selection of the elements can be provided with optional display, storage and/or delivery of the selected data over a network. Beneficially, generation of the derivative is performed by using distributed processing of the document in a network, where two or more computers are involved. Corresponding method of generation a database of the derivative documents is also provided.

30 Claims, 3 Drawing Sheets

METHOD AND SYSTEM FOR GENERATING A VALUE ENHANCED DERIVATIVE DOCUMENT FROM A PATENT DOCUMENT

FIELD OF THE INVENTION

The invention relates generally to a method and system for generation value enhanced documents, and in particular, to a method and system for generation a value enhanced derivative document from a patent document.

BACKGROUND OF THE INVENTION

With a widespread usage of computers and emergence of new technologies for information dissemination, such as Internet, the amount of information available to a user on his/her request quickly exceeds the user's ability to manage it. It happens in all areas of information technology, not leaving aside the area of intellectual property.

Patent applications are required to provide full disclosure of inventions, sufficient for someone skilled in the art to reproduce the invention. To satisfy this requirement, a uniform rigid sequential template for patent applications was developed to follow in Patent Offices around the world. As a result, many patent specifications, especially in high-tech area, are overloaded with information, approaching in size and complexity to books. For example, U.S. Pat. Nos. 5,850,446, 5,889,863, 5,812,668 and 5,943,424 are each about 250 pages long, contain dozens of figures and hundreds of claims. Just to get acquainted with them, let alone to comprehend, would require significant time and effort even for highly skilled professionals in the field. Though such a detailed disclosure could be definitely appreciated by some categories of patent users, others might be prevented from doing anything useful at all by shear volume of the available content. The problem is getting worse when such a volume of information has to be transmitted over a network, which not only clatters a user's display, but also wastes bandwidth and slows down the network traffic.

The remedies to this situation tried so far include limiting the amount of information sent to the user by employing various techniques of information volume reduction, e.g. sending/displaying only the first page of a patent disclosure (former USPTO bibliographic database at http://www.uspto.gov or Micropatent™ database at http://www.micropatent.com), filtering out anything but abstract and claims (IBM Patent Server at http://www.ibm.com/patent), and splitting monolithic patent disclosure into pieces and reconnecting them via HTML hyperlinks (IBM's Intellectual Property Network Server at http://www.delphion.com). Though definitely helpful, the above-mentioned approaches suffer from serious drawbacks, the most notable of which is sharp decrease in the user's chances to make an informed decision, because it is based on insufficient amount of information actually considered.

Accordingly, there is a need to develop an alternative approach of presenting and delivering patent document information which would provide value enhanced representation of the document and facilitate easier and quicker comprehension of the patent information.

SUMMARY OF THE INVENTION

Therefore it is an object of the invention to provide generation of a value enhanced derivative document from a patent document, which would avoid the above-mentioned problems.

According to one aspect of the invention there is provided a method of computerized generation of a derivative value enhanced document from a patent document, comprising the steps of:
 processing the patent document, comprising:
 selecting a segment of the patent document;
 processing the selected segment, including:
  extracting at least two portions of information from the selected segment of the document; and
  converting at least one of the extracted portions of information into at least one form;
 combining the converted portions of information into a derivative segment of the patent document so as to provide value enhanced representation of the segment; and
 forming the derivative document by combining the derivative segment and one of the patent document and a part thereof.

Advantageously, the step of combining the converted portions into a derivative segment of the patent document may comprise establishing links between the portions of information.

Conveniently, the step of converting the portions of information may comprise converting at least two of the extracted portions of information into forms so that each form comprises a subset of elements corresponding to sub-portions of the extracted portion of information. The step of converting may further comprise a step of selecting a subset of elements for each of the sets of elements and establishing correspondence between the elements of different subsets. Conveniently, the method may further comprise one or more of the following steps:
 displaying the selected subsets of elements on a computer screen; and
 displaying the selected subsets of elements on a computer screen in combination with other elements of the sets.

The step of converting the extracted portions of information may further comprise one or more steps selected from the list consisting of:
 converting the portions of information into at least two forms;
 converting the portions of information so that each at least one form of each portion is the same for all converted portions;
 converting the portions so that at least one form of each portion differs from forms of other portions; and
 converting the portions so that different portions are converted into different forms.

Converting portions of information into forms means converting of information into one of known formats or into another form of representing information suitable for the purpose of generation of the derivative document.

Conveniently, the step of converting the portions of information may comprise converting the portions into a format selected from the list consisting of graphical, text, HTML, SGML, XHTML XML, audio, video, and multimedia formats.

Beneficially, the step of forming the derivative document of the method described above may comprise a step selected from the list consisting of:
 forming the document so that the derivative segment is replacing the selected segment of the patent document;
 forming the document so that the derivative segment is supplementing the patent document;
 forming the document so that the derivative segment is supplemented by a segment of the patent document; and forming the document so that the derivative document is the derivative segment of the patent document.

The method as described above may further comprise a step of performing one or more of the following:

storing data obtained in at least one of the steps in a database;

sending data obtained in at least one of the steps over a network;

compressing data obtained in at least one of the steps;

displaying one of the derivative document and the derivative segment on a computer screen.

Conveniently, the step of processing of the document according to the method described above comprises distributed processing of the patent document in network environment, e.g. the step of distributed processing comprises the steps of initial processing of the document performed on a server side and final processing performed on a client (user) side. Alternatively, distributed processing may be done by using processing power of more than two computers in a network where certain processing functions are performed in parallel in order to reduce processing time.

Advantageously, in the method as described above, the step of selecting the segment comprises selecting a claim section of the patent document, and the step of extracting the information comprises extracting first and second portions of information, the portions of information being claim dependency and text of claims respectively.

Beneficially, the step of processing the selected segment comprises the following step, which is performed before the step of extracting portions of information:

when multiple dependent claims are present in the claim section, transforming multiple dependent claims into single dependent claims so that the number of single dependent claims generated from each multiple dependent claim is equal to the number of claims being referred to in the multiple dependent claim. Advantageously, the method further comprises the step of adding single dependent claims generated from multiple dependent claims to the end of original set of claims.

Alternatively, the method may comprise the steps of:

inserting claims generated from a multiple dependent claim into original set of claims immediately after the multiple dependent claim; and re-numbering claims starting from the multiple dependent claim and to the end of the claim section.

After multiple dependent claims have been transformed into single dependent claims, the step of converting advantageously comprises:

sorting single dependent claims by referred claim numbers; and interchanging positions of any two neighboring claims, the preceding claim and the succeeding claim, if they meet the following requirements:

both claims are dependent claims and refer to different claims; and succeeding claim does not refer to the preceding claim.

Thus, the method ensures effective rearrangement of claims suitable for their further representation.

Beneficially, the step of converting the portions of information comprises the steps of:

converting the first portion of information into a first form, the first form being a graphical format, comprising a set of graphical elements, each element corresponding to an individual claim; and converting the second portion of information into a second form, comprising a set of elements, each element being a text of an individual claim.

Conveniently, the step of converting the portions of information further comprises the steps of:

selecting a first subset of elements from the set of elements of the first format and a second subset of elements from the set of elements of the second format; and establishing correspondence between the elements of the first and second subsets using claim dependency.

Beneficially, the steps of selecting the subsets and establishing correspondence between the subsets may be performed so as to provide one to one correspondence between the elements of the first and second subsets, wherein corresponding elements from the different subsets represent the same claim.

Beneficially, the step of selecting first and second subsets is performed so as to provide a customized selection of the corresponding elements depending on the customer needs and requirements to the system. For example, only claims of interest can be selected and optionally further displayed and/or sent over a network and/or stored in a database. Some examples of customized selection of the subsets may comprise one of the following:

selecting the first subset comprising only one element of the first form, and the second subset comprising the corresponding element of the second form;

selecting the first subset comprising only one element of the first form, and the second subset comprising first and second elements of the second form, wherein the first element corresponds to the selected element of the first form, and the second element is the element on which the first element refers to according to claim dependency;

selecting the first subset comprising elements of the first form corresponding to independent claims only, and the second subset comprising elements of the second form corresponding to the selected elements of the first form;

selecting the first subset comprising elements of the first form corresponding to an independent claim and all the dependent claims referred thereto only, and the second subset comprising elements of the second form corresponding to the selected elements of the first form; and selecting the first subset comprising an independent claim only, and the second subset comprising elements of the second form corresponding to the selected independent claim and all dependent claims referred thereto.

Conveniently, the above-noted method, when applied to the generation of the derivative claim section of the patent document, may further comprise one or more of the following steps:

displaying the selected subsets of elements on a computer screen; and displaying the selected subsets of elements on a computer screen in combination with other elements of the sets.

Advantageously, the method described above is suitable to provide computerized generation of the derivative document in a network environment or in a single computer.

According to another aspect of the invention there is provided a derivative document generated according to a method including the following steps:

selecting a segment of a patent document;

processing the selected segment, including:

extracting at least two portions of information from the selected segment of the document; and converting at least one of the extracted portions of information into at least one form;

combining the converted portions of information into a derivative segment of the patent document so as to provide value enhanced representation of the segment; and forming the derivative document by combining the derivative segment and one of the patent document and a part thereof.

According to yet another aspect of the invention there is provided a method of computerized generation of a database, comprising the steps of:

(a) providing a patent document;
(b) selecting a segment of the patent document; processing the selected segment, including:
   extracting at least two portions of information from the selected segment of the document; and
   converting at least one of the extracted portions of information into at least one form;
combining the converted portions of information into a derivative segment of the patent document; and
forming the derivative document by combining the derivative segment and one of the patent document and a segment thereof;
(c) storing data obtained in at least one of the steps of the step (b) in a database; and
(d) repeating the steps (a) to (c) required number of times.

According to yet another aspect of the invention there is provided a database obtained according to the method including the steps (a) to (d) as described above.

According to yet another aspect of the invention there is provided a method of generation a derivative segment of a patent document, comprising the steps of:

selecting a segment of the patent document;
processing the selected segment, including:
   extracting at least two portions of information from the selected segment of the document; and
   converting at least one of the extracted portions of information into at least one form; and
combining the converted portions of information into the derivative segment of the patent document so as to provide value enhanced representation of the segment.

Beneficially, the step of combining the converted portions may comprise establishing links between the portions of information. Conveniently, the step of converting may comprise converting at least two of the extracted portions of information into forms so that each form comprises a subset of elements corresponding to sub-portions of the extracted portion of information. Further, the step of converting may comprise a step of selecting a subset of elements for each of the sets of elements and establishing correspondence between the elements of different subsets. Conveniently, the method may have one or more of the following additional steps:

displaying the selected subsets of elements on a computer screen; and
displaying the selected subsets of elements on a computer screen in combination with other elements of the sets.

The method may further include one or more of the following steps:

storing data obtained in at least one of the steps in a database;
sending data obtained in any one of the steps over a network;
compressing data obtained in at least one of the steps; and
displaying the derivative segment on a computer screen.

Conveniently, the step of converting the extracted portions of information may comprise a step selected from the list consisting of:

converting the portions of information into at least two forms;
converting the portions of information so that at least one form of each portion is the same for all converted portions;
converting the portions so that at least one form of each portion differs from forms of other portions; and
converting the portions so that different portions are converted into different forms.

The step of converting the portions of information may conveniently comprise converting the portions into forms, which are known formats selected from the list consisting of graphical, text, HTML, SGML, XML, audio, video, and multi-media formats.

The method described above is suitable to provide computerized generation of the derivative segment in a network environment or in a single computer. Beneficially, the step of processing the document comprises distributed processing of the patent document in network environment, e.g. distributed processing comprises the steps of initial processing of the document performed on a server side and final processing performed on a client (user) side. Alternatively, the step of distributed processing may comprise the step of using processing power of more than two computers in a network to reduce processing time, wherein the computers operate in parallel or sequentially. Yet alternatively, the step of distributed processing may comprise the step of using processing power of more than one processor in a computer.

According to yet another aspect of the invention there is provided a derivative segment of a patent document generated according to the following method:

selecting a segment of the patent document;
processing the selected segment, including:
   extracting at least two portions of information from the selected segment of the document; and
   converting at least one of the extracted portions of information into at least one form; and
combining the converted portions of information into the derivative segment of the patent document.

According to yet another aspect of the invention there is provided a computerized system for generation a derivative value added document from a patent document, comprising:

means for processing the document, comprising:
   means for selecting a segment of the patent document;
   means for processing the selected segment, including:
      means for extracting at least two portions of information from the selected segment of the document; and
      means for converting at least one of the extracted portions of information into at least one form;
   means for combining the converted portions of information into a derivative segment of the patent document; and
   means for forming the derivative document by combining the derivative segment and one of the patent document and a part thereof.

Beneficially, the system further comprises means for sending the derivative document over a network. Conveniently, means for processing the document comprises means for distributed processing of the patent document in a network environment.

According to one more aspect of the invention there is provided a computer program product for generation a derivative value enhanced document from a patent document, comprising:

a computer usable medium having computer readable program code means embodied in said medium for causing generation of the derivative document, said computer program product having:

computer readable program code means for causing said computer to perform one or more of the steps of the method of generation of the derivative document as described above; and computer readable program code means for causing said computer to perform one or more of the following:

storing data obtained in at least one of the steps of the method of generation of the derivative document as described above in a database;

retrieving data obtained in at least one of the steps of the method of generation of the derivative document as described above from a database;

sending data obtained in at least one of the steps of the method as described above over a network; and displaying the derivative document on a computer screen.

According to yet one more aspect of the invention there is provided a computer program product for generation a derivative segment of a patent document, comprising:

a computer usable medium having computer readable program code means embodied in said medium for causing generation of the derivative section, said computer program product having:

computer readable program code means for causing said computer to perform one or more of the steps of the method of generation a derivative segment as described above; and computer readable program code means for causing said computer to perform one or more of the following:

storing data obtained in at least one of the steps of the method as described above in a database;

retrieving data obtained in at least one of the steps of the method as described above from a database;

sending data obtained in at least one of the steps of the method as described above over a network; and displaying the derivative section on a computer screen.

The proposed method and system for computerized generation of a derivative document from a patent document provide value enhanced representation of the original patent document, and facilitate and accelerate comprehension of the patent information.

BRIEF DESCRIPTION OF THE DRAWINGS

Embodiments of the invention will now be described, by way of example, with reference to the accompanying drawings in which.

DETAILED DESCRIPTION OF THE PREFERRED EMBODIMENTS

Figure 1:
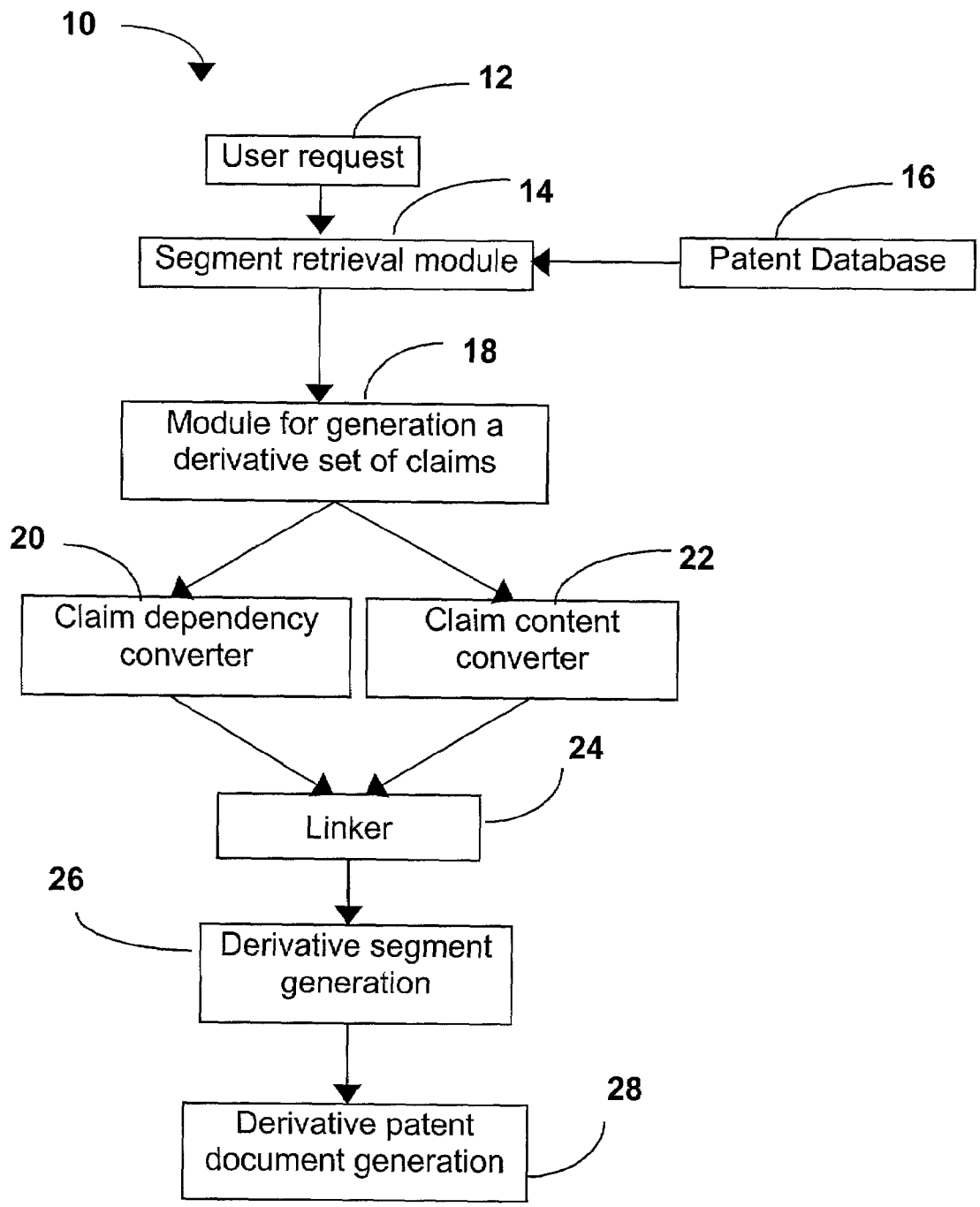
FIG. 1 is a block diagram of a computer-based system for generation a value enhanced derivative document from a patent document according to a first embodiment of the invention.

A computer based system 10 for generation a value enhanced derivative document from a patent document according to the first embodiment of the invention is schematically shown in FIG. 1. Generation of the derivative document starts when a user sends a request 12 for service, denoting a patent document of interest. This request is processed by a segment retrieval module 14, which retrieves the requested patent document from a patent database 16 and selects a segment of the patent document, the selected segment in the first embodiment being claim section. Module 18 determines suitability of the selected segment for further analysis and automatically generates a new, derivative set of single dependent claims if multiple dependent claims are present in the segment. Module 20 extracts claim dependency information, which forms a first portion of information, and performs initial conversion of claim dependency information into a first form, the form being a graphical format having elements, which correspond to the sub-portions of the first portion of information. The selected claim section of the patent document is also sent for processing to module 22 which extracts text of claims, optionally without claim numbers, splits the text into sub-portions of information (individual claims) which form a second portion of information presented in a second form. Module 24 establishes correspondence between the first and second portions of information. Module 26 finalizes conversion of claim dependency information into graphical format and combines converted portions of information into a new derivative segment of the original patent document. Finally, module 28 incorporates the derivative segment into the original patent document to form the derivative patent document, in first embodiment the derivative segment replacing the original segment of the document.

Thus, a computerized generation of a derivative patent document is provided.

Figure 2:
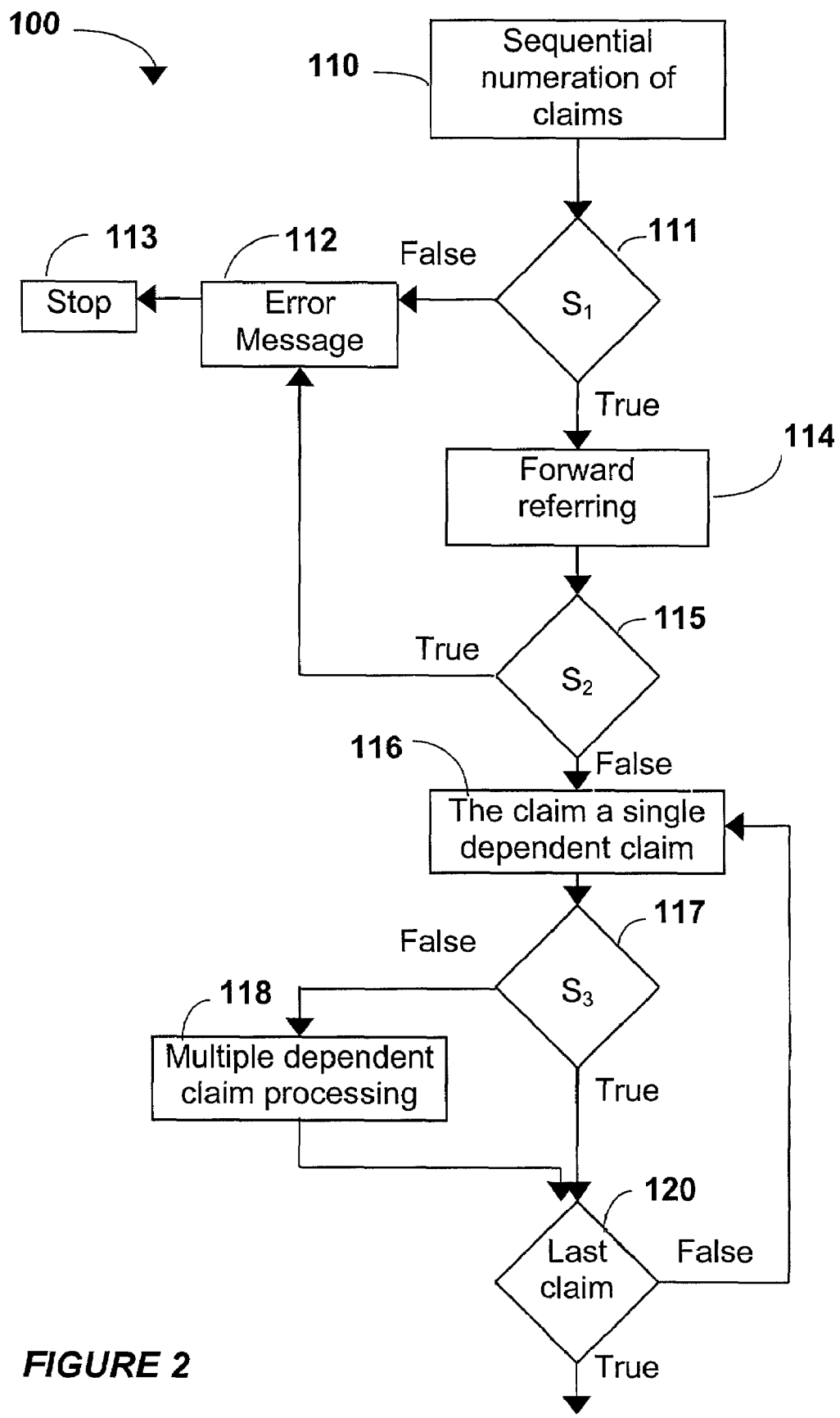
FIG. 2 is a flow-chart illustrating claim structure analysis.

The system 10 provides preparation of the derivative document in the following manner. Claim section is scanned and analyzed to determine whether it meets certain conditions as stated below and illustrated by flow-chart 100 in FIG. 2 explaining operation of module 18 in more detail.

Condition 1. Claims must be enumerated sequentially starting from claim No. 1.

Condition 2. Claims may optionally refer only to previous claims, no forward referencing is allowed.

Condition 3. Any claim may optionally refer to one claim only, i.e. there are no multiple dependent claims.

Condition 1 is verified in box 110 followed by generation of a logical signal $S_1$ as shown in the flow-chart 100. Actual value of the signal $S_1$ is verified in box 111. If condition 1 is not met, the signal $S_1$ is assigned the logical value FALSE, which results in generation of an error message 112 and termination of the analysis of claim section (box 113). If condition 1 is met, the signal $S_1$ is assigned the logical value TRUE, thus allowing further verification of the condition 2 (box 114).

Condition 2 is verified in box 114 followed by generation of a logical signal $S_2$ whose actual value is analyzed in box 115. If condition 2 is not met, the signal $S_2$ is assigned the logical value FALSE, which results in generation of an error message 112 and termination of claim section analysis (box 113). If the condition 2 is met, the logical value TRUE is assigned to the signal $S_2$, allowing further verification of the condition 3.

Condition 3 is verified in box 116, followed by generation of a logical signal $S_3$ whose actual value is analyzed in box 117. If the condition 3 is met, the signal $S_3$ is assigned the logical value TRUE, followed by verification whether all claims have been processed (box 120). If condition 3 is not met, signal $S_3$ is assigned logical value FALSE which triggers additional processing of multiple dependent claims (box 118), followed by verification whether all claims have been processed (box 120). If there are any claims to be processed, the system returns to box 116 and repeats the steps 116, 117, 118 and 120 required number of times until the last claim is processed.

Processing of a multiple dependent claim in box 118 comprises transforming the claim into a derivative set of single dependent claims, which is performed in the following manner. First, the total number of claims T in claim section is determined, followed by extraction of claim dependency information from the multiple dependent claim. Second, a list L, whose elements are numbers of claims to which the multiple dependent claim refers, is generated, the length N of the list being the total number of the referred claims. Third, N copies of the original multiple dependent claim are generated and transformed so that the multiple dependent references in the copied claims are consecutively replaced by the respective elements from the list L so as to form corresponding single dependent claims. The first transformed claim is assigned the original number of the multiple dependent claim. The rest of the transformed claims are assigned consecutive numbers starting immediately after T, the total number of claims in the original claim section. Conveniently, newly assigned numbers are stored and/or displayed in association with the original number of the multiple dependent claim from which they have been originated. Thus, the total number of claims has been extended by N−1 claims generated from the multiple dependent claim, resulting in total current number of claims in the claims section becoming T+N−1. If additional multiple dependent claims are processed, the total current number of claims may be extended further. Alternatively, additional single dependent claims generated from a multiple dependent claim may be inserted into the original set of claims immediately after the multiple dependent claim, followed by re-numbering of claims starting from the multiple dependent claim and to the end of claim section.

Thus, a derivative set of single dependent claims satisfying the above-mentioned conditions 1-3 and replacing claims in the original patent document is generated.

Conveniently, the system 10 generates two copies of the derivative single dependent claims for further analysis in modules 20 and 22 as shown in FIG. 1.

The first copy of the transformed derivative claims is further analyzed in module 20 to extract claim dependency information and to present it as a list of pairs, the left number in each pair being the current claim number, and the right number being the claim number to which the current claim refers. For example, if claim No. 6 is referring to claim No. 3, the proper pair is (6,3). To preserve consistency of such a list, independent claims are considered to refer to a non-existing claim No. 0, e.g. the main claim is represented by pair (1,0). A typical list of pairs may look like the one shown below:

(1,0)(2,1)(3,1)(4,0)(5,4)(6,3)  (1)

Graphical representation of the list of pairs requires re-arrangement of claims so that dependent claims are placed as close as possible to the claims to which they refer. More precisely, any two pairs $(P_1,Q_1)$ and $(P_2,Q_2)$ such that $P_1=Q_2$ (conjugated pairs), which are separated by at least one claim, should be grouped together without destroying the order in which they appear in the original list of pairs. For example, in the list of pairs (1) shown above, the pair (6,3) should be moved to be next to the right of the pair (3,1) as illustrated below:

(1,0)(2,1)(3,1)(4,0)(5,4)(6,3)—original arrangement (1,0)(2,1)(3,1)(6,3)(4,0)(5,4)—required arrangement Re-arrangement of the list of pairs can be achieved by applying the following re-arrangement rules:
A) sorting the list of pairs by the right numbers; and
B) interchanging positions of any two neighboring pairs, the preceding pair and the succeeding pair, if they meet the following requirements:
   a) the succeeding pair has a non-zero right number (which means that the corresponding claim is a dependent claim);
   b) right numbers of the pairs are not equal (which means that corresponding claims refer to different claims); and
   c) right number of the succeeding pair and left number of the preceding pair are not equal (which means that of the two claims the succeeding claim does not refer to the preceding claim).

The following theorem proves that such rearrangement does not destroy the order in which conjugated pairs appear in the original list of pairs.

Theorem

If the list of pairs derived from a claim section of the patent document is sorted by the right number in ascending order, then for any two pairs $(P_k,Q_k)$ and $(P_n,Q_n)$ of the sorted list such that $P_k=Q_n$, the inequality n>k holds true.

Proof

According to the condition 1, left number of any pair in the original list is bigger than its right number, i.e.

$$P_k > Q_k \text{ for any } k>0 \quad (2)$$

Sorting procedure changes the arrangement of pairs, but does not change the order of right and left numbers in a pair. It means that for any single pair in the sorted list, the inequality (2) remains true. According to the conditions of the theorem, $P_k=Q_n$, therefore the inequality (2) can be re-written as $Q_n>Q_k$. In a list sorted in ascending order, bigger indexes correspond to bigger numbers. Thus, from $Q_n>Q_k$, it follows that n>k.

Further processing of the list of pairs includes generation of a one-dimensional list of numbers, all of them being initially equal to zero. The list of pairs is scanned, and for each pair $(P_k,Q_k)$, where k is the current pair number, the following transformations of the one-dimensional list are performed:
   find $R_n$-th element, where $n=P_k$
   find $R_m$-th element, where $m=Q_k$
   set $R_n$-th element equal to the sum of $R_m$-th element and a pre-determined offset DX.

When the list of pairs is exhausted, it is scanned once again, substituting every pair $(P_k, Q_k)$ by a triplet $(P_k, (k-1)*DY, R_k)$, the components of the triplet being "claim number", "vertical offset" and "horizontal offset" respectively, and DY being a pre-determined offset. Generation of the list of triplets concludes preparation of claim dependency information for conversion into a graphical format.

The second copy of the transformed derivative single dependent claims is analyzed in module 22 to extract individual claims.

Module 24 establishes links between the claim dependency information and text of claims, derived in modules 20 and 22 respectively. It is achieved by adding the fourth component to triplets, the component being text of the claim whose sequential number is defined by the first element of the triplet. As a result, the list of quadruplets is generated, the components of the quadruplet being "claim number", "vertical offset", "horizontal offset", "claim text".

Now both portions of information are prepared for combining into the derivative segment of the patent document as illustrated in FIG. 1 (module 26). First, a 2×1 table is built where text of claims, derived from the list of quadruplets is placed into its right column. Second and third components of any quadruplet are used to convert first portion of information into graphical form, e.g. JPEG, GIFF or other known graphical formats. Using one of known software packages, e.g. GD.pm, the produced image is placed into the left column of the table. Such structure of the derivative segment allows users to see simultaneously both traditional claim section content and graphical representation of the claim section structure. The new derivative section is integrated into the original patent document replacing the old section, thus completing generation of the value enhanced derivative patent document as shown in module 28 in FIG. 1. The document is then sent to a computer display for viewing by a local user (not shown).

Instead of being viewed by the local user, the derivative document can be sent to a remote user over a network, e.g. LAN, Internet. Additionally, the data obtained in any of the steps of FIG. 1 after the step 14, can be optionally stored in a database for future processing. Conveniently, the data may be compressed and/or sent over a network.

In modifications to the above embodiment, portions of the extracted information may be divided into customized sub-portions of information, e.g. sub-portions of information may be independent claims only or a branch of claims referring to the same independent claim. Portions and sub-portions of information correspond to sets and subsets of elements in the respective converted forms. Selection of sub-portions of information and their displaying to a user can be done in a variety of ways.

Figure 3:
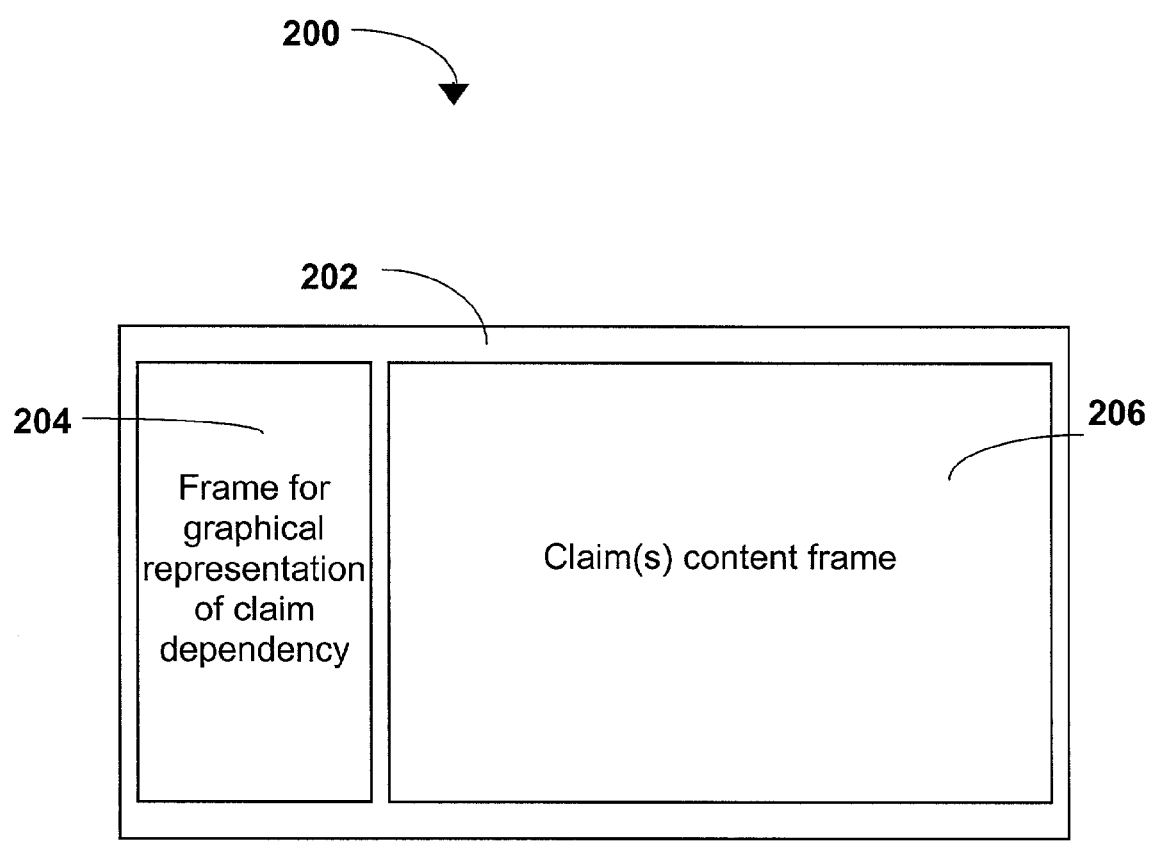
FIG. 3 is a two-frame window layout for displaying the derivative patent document on a computer screen.

For example, the derivative document can be formed similar to that of the first embodiment described above, except for the different portions of information extracted from the section of the document are now being placed into different window layout frames for displaying on a computer screen. Referring to FIG. 3, available display area 202 is divided vertically into two frames. The left frame 204 is designated for graphical representation of the claim structure, while the right frame 206 is designated for the claim content. List of quadruplets is processed by the computer program similar to the one mentioned above, but this time elements of the graphical representation of the claim structure become active, i.e. they represent clickable calls to the designated function of the computer program. This function determines which element has been clicked upon, finds corresponding claim content in the list of quadruplets and sends it into another frame for viewing. The user can view the claim structure and click on any claim of his choice to view its content in another frame. Such arrangement is especially suitable for patent documents having long claim section.

This embodiment provides the following advantages:
   The whole graphical representation of claim dependency can be scrolled up and down independently of the claim content;
   Graphical representation of claim dependency is not cluttered with information which does not relate to claim dependency;
   Content of only one claim at a time is shown in the claim content frame, which, normally, eliminates the need for scrolling.
   Alternatively, a content of up to several claims can be shown simultaneously in the claim content frame in response to a mouse click on the graphical element corresponding to a specific claim. For example, the above mentioned function which processes the click, may determine not only the graphical element clicked upon, but in addition make an analysis of the following conditions:
   how many immediate dependent claims refer to the claim clicked upon; and
   how many claims contain the claim clicked upon as an immediate dependent claim.

If there are any claims that satisfy the above conditions, content of these claims is shown in an appropriate order relative to the claim clicked upon.

The above modifications provide selection of a first subset of elements from the set of elements of the first format and a second subset of elements from the set of elements of the second format, and establishing correspondence between the elements of the first and second subsets using claim dependency. Beneficially, establishing of correspondence between the subsets is performed so as to provide one to one correspondence between the elements of the first and second subsets, wherein corresponding elements from the different subsets represent the same claim.

In further modifications to the above embodiment, selection of subsets of elements may be done in one of the following ways:
   selecting the first subset including one graphical element only, and the second subset including text of two claims, the first claim corresponding to the selected graphical element, and the second claim being the claims on which the first claim refers to according to claim dependency,
   selecting the first subset graphical elements corresponding to independent claims only, and the second subset comprising text of the selected claims, or
   selecting the first subset including graphical elements corresponding to an independent claim and all the dependent claims referred thereto only, and the second subset including text of the selected claims.

Advantageously, selection of first and second subsets is done so as to provide customized selection of the corresponding elements, wherein a customer can arrange for a menu suitable for personalized viewing of the derivative segment of the patent document.

It is also understood that selected elements and/or corresponding portions of information can be displayed on a computer screen, stored in a database, sent over a network, either alone or in combination with other elements of the sets for all of the listed functions.

Further modifications may be made to the embodiments described above. Instead of generation of a derivative claim section, other segments of the patent document may be transformed according to the method described above to form the derivative segment and the derivative patent document. For example, claims and selected parts of the detailed description may be extracted as portions of information. They may be converted into corresponding forms and, if required, linked together so as to facilitate understanding of patent information. Other types of computerized extraction and transformation of patent document information can also be done in accordance with this invention.

Once the derivative segment of the patent document is generated, forming of the derivative document can be done in various ways. For example, the derivative document may be formed so that the derivative segment is replacing the selected segment of the patent document. Alternatively, forming of the derivative document may be done so that the derivative segment is supplementing the patent document, or it may be done so that the derivative segment is supplemented by a segment of the original patent document. Yet alternatively, the derivative document may be formed so as to include the derivative segment of the document only. Forming of the derivative document can also be done in accordance with other suitable arrangements.

It is contemplated that more than two portions of information may be extracted from the selected segment of the patent document, and where appropriate, portions of information can be converted into same or different forms. Different portions of information may be converted into different forms, e.g. in the first embodiment two portions of information extracted from claim section are converted into graphical and text formats. Alternatively, it may be required to convert a portion of information into more than one form, e.g. graphical and text, or two graphical forms. Conversion of portions of information into forms may be done so that at least one form of each portion is the same for all converted portions, e.g. all portions of information may have text form. Yet alternatively, it may be convenient to convert portions of information into forms so that at least one form of each portion is different from forms of other portions. Conveniently, forms to which extracted portions of information are converted may include some of the known formats, e.g. graphical, text, HTML, SGML, XHTML, XML, audio, video, and multi-media formats.

In yet another embodiment of the invention the derivative segment and derivative patent document are generated by using a distributed processing of the original patent document, e.g. initial processing of the patent document is performed on a server side, while final processing is performed on a client (user) side to minimize server load. Initial processing includes receiving user's request, retrieving corresponding patent document from a database, generating list of quadruplets, supplementing this data with a computer program, e.g. written in JavaScript, for further processing of the patent document on the client side, and sending the data and the computer program to the user. Reference to the computer program can be embedded into an appropriate place in the patent document, e.g. head section of HTML page. Alternatively, the program source code can be embedded directly into the document. When the user's browser receives the document, the computer program is activated to perform intended final processing of the list of quadruplets and subsequent extraction of the first and second portions of information. When all the information is extracted, converted portions of information are combined into the derivative segment of the patent document as described earlier. When the derivative segment is formed, the browser proceeds with the rendering of the rest of the patent document. Other distribution of processing functions between the server and the client computer can also be arranged depending on the complexity and volume of the document processing.

In a modification to this embodiment, the distributed processing of the patent document may be performed on more than two computers in a network, e.g. application server, server and user's (client) computer. Certain processing functions may be performed in parallel in order to reduce processing time. Yet alternatively, the step of distributed processing may comprise the step of using processing power of more than one processor in a computer.

In one more embodiment of the invention, processing of the original patent document is performed in two stages. In the first stage the original patent document is retrieved from a database and converted into an intermediate form, e.g. list of quadruplets. The database can be either a local database stored in an isolated computer or a remote database stored in a workstation of LAN, or available over the Internet. The results of such processing in the form of the above-mentioned quadruplets, are stored in another database until a user requests them. Thus, by repeating the intermediate processing required number of times for selected documents, the database of intermediate forms (quadruplets) is created. In the second stage, the list of quadruplets is retrieved from the database upon the user's request and processed by one of the methods as described in detail above. For example, selected list of quadruplets can be sent to the user's computer for final processing and displaying in the two-frame window.

In a modification to the described embodiments, the selected segment of one patent document can be processed and transformed into a new, value enhanced segment by any of the above mentioned methods, and embedded into appropriate place of another patent document. For example, value enhanced claim section of a patent document can be embedded into the corresponding patent review instead of replacing the original claim section of the patent document.

Although specific embodiments of the invention have been described in detail, it will be apparent to one skilled in the art that variations and modifications to the embodiments may be made within the scope of the following claims.

We claim:

1. A method of computerized generation of a derivative value enhanced document from a patent document, comprising the steps of:
   (a) selecting a claim section of the patent document;
   (b) processing the claim section, including:
      (i) transforming multiple dependent claims into single dependent claims;
      (ii) sorting the transformed claims by claim numbers to which the claims refer to;
      (iii) interchanging positions of any two neighboring sorted claims, the preceding claim and the succeeding claim, if they meet the following requirements:
         both claims are dependent claims and refer to different claims; and
         succeeding claim does not refer to the preceding claim;
   (c) extracting claim dependency and text of claims from the interchanged claim section;
   d) converting the extracted claim dependency into a graphical form, comprising a set of graphical elements, each element corresponding to an individual claim or a group of claims;
   (e) converting the extracted text of claims into a textual form, comprising a set of elements, each element being a text of an individual claim or a text of a group of claims;
   (f) forming a derivative claim section by combining the converted graphical and textual elements of the converted claim dependency and text of claims in the order obtained after the step (iii) of interchanging; and
   (g) forming the derivative document by combining the derivative claim section with the patent document or a part of the patent document.

2. A method as described in claim 1, wherein the steps of converting further comprise establishing links between the elements of the graphical and textual subsets according to the transformed claim dependency.

3. A method as described in claim 1, further comprising one or more of the following:
   displaying the selected subsets of elements on a computer screen; and displaying the selected subsets of elements on a computer screen in combination with other elements of the sets.

4. A method as described in claim 1, wherein the step (e) comprises converting into the form selected from the list consisting of ASCII, HTML, SGML, XHTML, and XML formats.

5. A method as described in claim 1, wherein the step (g) comprises a step selected from the list consisting of:
forming the document so that the derivative claim section is replacing the claim section of the patent document;
forming the document so that the derivative claim section is supplementing the patent document;
forming the document so that the derivative claim section is supplemented by a part of the patent document; and
forming the document so that the derivative document is the derivative claim section of the patent document.

6. A method as described in claim 1, further comprising a step of performing one or more of the following:
storing data obtained in at least one of the steps in a database;
sending data obtained in at least one of the steps over a network;
compressing data obtained in at least one of the steps;
displaying one of the derivative document and the derivative segment on a computer screen.

7. A method as described in claim 1, wherein the step (b) comprises distributed processing of the patent document in a network environment performed by using processing power of more than one computer.

8. A method as described in claim 7, wherein the step of distributed processing comprises the steps of initial processing of the document performed on a server side and final processing performed on a client side.

9. A method as described in claim 1, wherein the step of selection of the subset of elements comprises the step selected from the list consisting of:
selecting the subset comprising only one element in one form, and displaying the selected subset in said one form with the related subset comprising the corresponding element of the other form;
selecting the subset comprising only one element in one form, and displaying the selected subset in said one form along with the related subset in the other form comprising first and second elements, wherein the first element corresponds to the selected element of the first form, and the second element is the element on which the first element refers to according to claim dependency;
selecting the subset comprising elements of one form corresponding to independent claims only, and displaying the selected subset in said one form along with the related subset in the other form comprising elements of the other form corresponding to the selected elements of said one form;
selecting the subset comprising elements in one form corresponding to an independent claim and all the dependent claims referred thereto only, and displaying the selected subset in said one form along with the related subset comprising elements in the other form corresponding to the selected elements in said one form; and
selecting the first subset comprising an independent claim only in one form, and displaying the selected subset in said one form along with the related subset comprising elements in the other form corresponding to the selected independent claim and all dependent claims referred thereto.

10. A method as described in claim 9, further comprising one or more of the following:
displaying the selected subsets of elements on a computer screen; and
displaying the selected subsets of elements on a computer screen in combination with other elements of the sets.

11. A computer program product for generating a derivative document from a patent document, comprising a computer usable medium having computer readable program code means embodied in said medium for causing said computer to perform the steps of the method as described in claim 1.

12. A method as described in claim 1, wherein the step (i) further comprises one of the following:
adding single dependent claims generated from multiple dependent claims to the end of original set of claims; or
inserting claims generated from a multiple dependent claim into original set of claims immediately after the multiple dependent claim, followed by re-numbering of claims starting from the multiple dependent claim and to the end of claim section.

13. A method as described in claim 1, wherein the step (f) further comprises associating the derivative claim section with a computer program code providing a user interactive selection of a subset of elements in one of the graphical and textual forms, and displaying said subset in the selected form along with the related subset of elements according to the transformed claim dependency in the other form to a user, the elements in the graphical form being displayed in the order obtained after the step (iii) of interchanging.

14. A method as described in claim 1, wherein the step (c) of extracting claim dependency comprises forming a respective triplet for each interchanged claim, the triplet comprising first, second and third elements which are respectively as follows:
a claim number;
a vertical offset, characterizing a vertical position of the claim, which is defined by the relative position of the claim compared to the first claim in the interchanged set of claims;
a horizontal offset, characterizing a horizontal position of the claim, which is defined by the level of claim dependency for the claim.

15. A method as described in claim 14, wherein the step (d) of converting comprises converting said triplets into respective graphical elements which are arranged into a tree, wherein vertical and horizontal positions of the graphical elements in the tree are defined by the vertical and horizontal offsets in the respective triplets.

16. A method as described in claim 15, wherein the step (c) further comprises forming a cofresponding quadruplet for each interchanged claim, the quadruplet comprising the respective triplet and a fourth element, which is a text of the claim.

17. A method as described in claim 16, wherein the step (f) comprises a simultaneous displaying a subset of graphical elements from said tree along with the related subset of fourth elements from the quadruplets.

18. A method of computerized generation of a database stored in a memory, comprising the steps of:
(a) providing a patent document;
(b) performing the steps of the method as described in claim 1; and
(c) storing data obtained in at least one of the steps of the step (b) in a database stored in the memory.

19. A database stored in a memory and obtained according to the method as described in claim 18.

20. A method of computerized generation of a derivative claim section from a patent document, comprising the steps of:
(a) selecting a claim section of the patent document;
(b) processing the claim section, including:

(i) transforming multiple dependent claims into single dependent claims;
(ii) sorting the transformed claims by claim numbers to which the claims refer to;
(iii) interchanging positions of any two neighboring sorted claims, the preceding claim and the succeeding claim, if they meet the following requirements:
both claims are dependent claims and refer to different claims; and
succeeding claim does not refer to the preceding claim;
(c) extracting claim dependency and text of claims from the interchanged claim section;
(d) converting the extracted claim dependency into a graphical form, comprising a set of graphical elements, each element corresponding to an individual claim or a group of claims;
(e) converting the extracted text of claims into a textual form, comprising a set of elements, each element being a text of an individual claim or a text of a group of claims; and
(f) forming a derivative claim section by combining the converted graphical and textual elements of the converted claim dependency and text of claims in the order obtained after the step (iii) of interchanging, and associating thereof with a computer program code providing a user interactive selection of a subset of elements in one of the graphical and textual forms, and displaying said subset in the selected form along with the related subset of elements according to the transformed claim dependency in the other form to a user, the elements in the graphical form being displayed in the order obtained after the step (iii) of interchanging.

21. A method as described in claim 20, wherein the steps of converting further comprise establishing links between the elements of the graphical and textual subsets according to the transformed claim dependency.

22. A method as described in claim 21, further comprising one or more of the following:
displaying the selected subsets of elements on a computer screen; and
displaying the selected subsets of elements on a computer screen in combination with other elements.

23. A method as described in claim 20, wherein the step (e) comprises converting into the form selected from the list consisting of ASCII, HTML, SGML, XHTML and XML formats.

24. A method as described in claim 20, wherein the step (b) comprises distributed processing of the claim section in a network environment performed by using processing power of two or more computers.

25. A method as described in claim 24, wherein the step of distributed processing comprises the steps of initial processing of the claim section performed on a server side and final processing of the claim section performed on a client side.

26. A computer program product for generating a derivative claim section of a patent document, comprising a computer usable medium having computer readable program code means embodied in said medium for causing said computer to perform the steps of the method as described in claim 20.

27. A computerized system for generating a derivative document from a patent document, comprising a computer having a memory, said memory comprising:
(a) means for selecting a claim section of the patent document;
(b) means for processing the claim section, including:
(i) means for transforming multiple dependent claims into single dependent claims;
(ii) means for sorting the transformed claims by claim numbers to which the claims refer to;
(iii) means for interchanging positions of any two neighboring sorted claims, the preceding claim and the succeeding claim, if they meet the following requirements:
both claims are dependent claims and refer to different claims; and
succeeding claim does not refer to the preceding claim; and
(c) means for adding a new section to the patent document or to a part thereof to form the derivative document, the new section comprising a computer program code for interactive displaying the transformed sorted and interchanged claim section or any part thereof, or a reference to a file where the computer program code resides, the computer program code being executable in response to an event.

28. A computerized system as described in claim 27, further comprising means for sending the derivative document over a network.

29. A computerized system as described in claim 27, wherein the means (b) comprises means for distributed processing of the document in a network, wherein processing power of two or more computers is used.

30. A computerized system for generating a derivative claim section of a patent document, the system comprising a computer having a memory, said memory comprising:
(a) means for processing the claim section, including:
(i) means for transforming multiple dependent claims into single dependent claims;
(ii) means for sorting the transformed claims by claim numbers to which the claims refer to;
(iii) means for interchanging positions of any two neighboring sorted claims, the preceding claim and the succeeding claim, if they meet the following requirements:
both claims are dependent claims and refer to different claims; and
succeeding claim does not refer to the preceding claim; and
(b) means for extracting claim dependency and text of claims from the interchanged claims;
(c) means for converting the extracted claim dependency into a graphical form, comprising a set of graphical elements, each element corresponding to an individual claim or a group of claims;
(d) means for converting the extracted text of claims into a textual form, comprising a set of elements, each element being a text of an individual claim or a text of a group of claims; and
(e) means for forming a derivative claim section by combining the converted graphical and textual elements of the converted claim dependency and text of claims in the order obtained after the step (iii) of interchanging, and associating thereof with a computer program code providing a user interactive selection of a subset of elements in one of the graphical and textual forms, and displaying said subset in the selected form along with the related subset of elements according to the transformed claim dependency in the other form to a user, the elements in the graphical form being displayed in the order obtained after the step (iii) of interchanging.

* * * * *